United States Patent [19]

Robin

[11] Patent Number: 5,280,833
[45] Date of Patent: Jan. 25, 1994

[54] TURN CONVEYOR WITH REDUCED FRICTION FEATURE

[76] Inventor: Andre Robin, 8630 Farley Way, Fair Oaks, Calif. 95628

[21] Appl. No.: 750,613

[22] Filed: Aug. 27, 1991

[51] Int. Cl.⁵ .............................................. B65G 15/02
[52] U.S. Cl. ................................ 198/831; 198/494; 198/497; 198/852
[58] Field of Search ............... 198/831, 852, 850, 851, 198/853, 493, 494, 497, 841

[56] References Cited

U.S. PATENT DOCUMENTS

| | | | |
|---|---|---|---|
| 4,222,483 | 9/1980 | Wootton et al. .................... | 198/831 |
| 4,436,200 | 3/1984 | Hodlewsky et al. ............ | 198/957 X |
| 4,742,907 | 5/1988 | Palmaer ............................... | 198/831 |
| 4,944,162 | 7/1990 | Lang et al. ....................... | 198/831 X |
| 5,020,656 | 6/1991 | Faulkner ............................. | 198/494 |

*Primary Examiner*—Cheryl L. Gastineau
*Attorney, Agent, or Firm*—Thomas R. Morrison; George J. Brandt, Jr.

[57] ABSTRACT

A turn conveyor system includes a plurality of friction-reducing members disposed along at least the inner edge of the belt to minimize the friction between the belt and the conveyor frame. The members are formed, in whole or in part, from a plastic material having a coefficient of friction of less then 0.2 and may advantageously include raised vee-shaped portions adapted to remove debris from between the belt and the frame.

9 Claims, 13 Drawing Sheets

TURN CONVEYOR WITH REDUCED FRICTION FEATURE

BACKGROUND

The present invention pertains to load handling equipment and, more particularly, to an improved turn conveyor system.

Throughout industry and agriculture, conveyors are used to move and process products and materials.

One type of conveyor used for these applications is called a "turn conveyor". Turn conveyors typically consist of an infeed section, an arced or radius section, and a discharge section.

The carrying surface or "belting" for these conveyors is of two main types, fixed radius and variable radius.

Variable radius belting is constructed in a fashion that enables it to move uninterruptedly through straight sections and turn sections, eliminating product transfer points that would otherwise disturb the product flow. This type of belting can, within certain limits, conform or "side flex" to different inside radii, enabling a much greater variety of layout configurations.

Fixed radius belts conform to an arced section only, with no continuity between adjoining straight sections, necessitating product transfers onto and off of the turn section.

Both fixed radius and variable radius belts are constructed of metal and plastic.

There are a number of different belt designs employed to similar effect. There are, however, technical limitations and problems common to all these belts that greatly reduce the conveyor design possibilities and limit effective loading on these belts. These problems are all manifest as destructive levels of belt tension, and the proximate cause is friction. This friction has three sources:

1. Contact between the "inside" or minor radius edge of a radius conveyor belt and the conveyor structure that defines this radius.

2. Contact between the "outer" or major radius edge of a radius conveyor belt and any device that are used to hold it down; that is, prevent the belting from "lifting" or "flipping up" from excessive tension as it moves through the radius portion of a conveyor. (These "hold down" devices are sometimes used on the minor radius edge as well).

3. Friction between the "bottom" or underside of the conveyor belt and the surface on which it rides.

Currently, typical construction for turn conveyors has a metal frame supporting a metal or plastic conveyor belt. To help reduce both wear and friction, plastic stripping is applied at the appropriate contact points on the frame. This "wear stripping", is usually ultra high molecular weight (U.H.M.W.) polyethylene or an "engineering" grade nylon.

Typically, the best coefficient of friction that can be expected is 0.2 and that increses drastically under usual operating conditions when dirt and production debris enter between the belt and the frame.

At present, manufacturers of radius belting construct the belt edges of the same material as the belt body. Typically, this means stainless steel belting with stainless steel edges, and polyethylene or polypropylene belts with edges of these respective materials. This is true for both fixed and variable radius belting.

The only known exception to this is a fixed radius belt manufactured by Pulver Systems of Chicago Ridge, Ill. This belt, known as a "Meshlok" turn belt, is of a rod type construction, with the outer edge of the belt being of a greater pitch than the inner, thus creating and describing the radius which the belt conforms. In this belt, journals are turned in the ends of each rod to accept connection links of flat steel that have been appropriately perforated. A shoulder is left on each rod end. This shoulder is of the same diameter as the main body of the rod and approximately 3/16' long. Nylon caps "snap" over the rod ends to retain the connection links and act as a bearing surface on the inside. On the outside, metal spring clips are used for retention, apparently no consideration having been given to the use of bearing grade materials on the outside edge.

A number of problems arise with this design:

1. Rod caps frequently pop off during conveyor use causing product contamination and exposing metal rods to what is typically a metal wear surface, thereby generating metal contaminants.

2. Nylon, the cap material has a coefficient of friction of 0.2 which is approximately the same as most other belt edge materials coacting with their respective wear surfaces, consequently producing no significant friction reduction.

3. The rod caps have severly limited bearing surface, and thus, suffer a high bearing pressure, which greatly increases the chances of galling of the bearing surfaces and deformation of the plastic rod cap.

4. With the type of connection link used, the belt rods can "articulate", allowing a single rod to move away from the plane or "track" of belt movement under heavy loads or extremely high speed or when a rod is bent This phenomenon tends to exacerbate problems 1 and 3.

SUMMARY OF THE INVENTION

Accordingly, it is an object of the invention to provide a turn conveyor system which overcomes the drawbacks of the prior art.

It is a further object of the invention to provide a turn conveyor system having a reduced belt tension and, more particularly, to provide such a system wherein the tension reduction is effected by a reduction in the friction between the conveyor belt and the frame.

It is a still further object of the invention to provide a conveyor system as aforementioned wherein the desired friction reduction is accomplished with minimal use of expensive materials.

It is another object of the invention to provide such a conveyor system having means for the removal of debris from between the conveyor belt and the frame.

It is yet another object of the invention to provide a friction-reducing means which may be conveniently fitted to a wide variety of existing turn conveyor systems.

In accordance with these and other objects of the invention, there is provided an improved turn conveyor comprising a frame and a flexible endless belt movably carried thereon, wherein a plurality of friction-reducing members are disposed along the inner edge of the belt to minimize friction between the inner edge of the belt and the frame.

According to a further feature of the invention, the friction-reducing members are formed, at least in part, of a material having a coefficient of friction of less than 0.2 and may advantageously include means adapted to remove debris from between the belt edge and the frame.

According to a still further feature of the invention, the turn conveyor system may further, or alternatively, comprise a plurality of frame-engaging members disposed along the outer edge of the belt and adapted to engage the "hold down" devices which prevent the belt edge from lifting under load. More specifically, the frame-engaging members are formed, at least in part, of a material having a coefficient of friction of less than 0.2 and may advantageously include means adapted to remove debris from between the belt edges and the frame.

According to a still further feature of the invention, either or both the friction reducing members and the frame-rods linking the segments which comprise the belt.

The above, and other objects, features and advantages of the present invention will become apparent from the following description read in conjunction with the accompanying drawings, in which like reference numerals designate the same elements.

DESCRIPTION OF THE PREFERRED EMBODIMENTS

Figure 1:
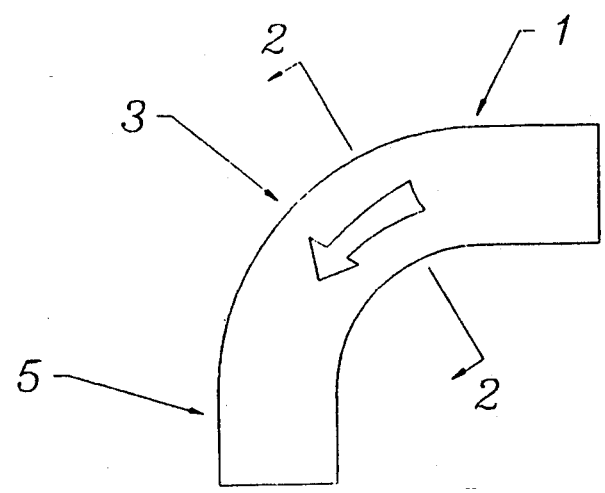
FIG. 1 is a simplified top plan view of a typical variable radius turn conveyor.
Figure 2:
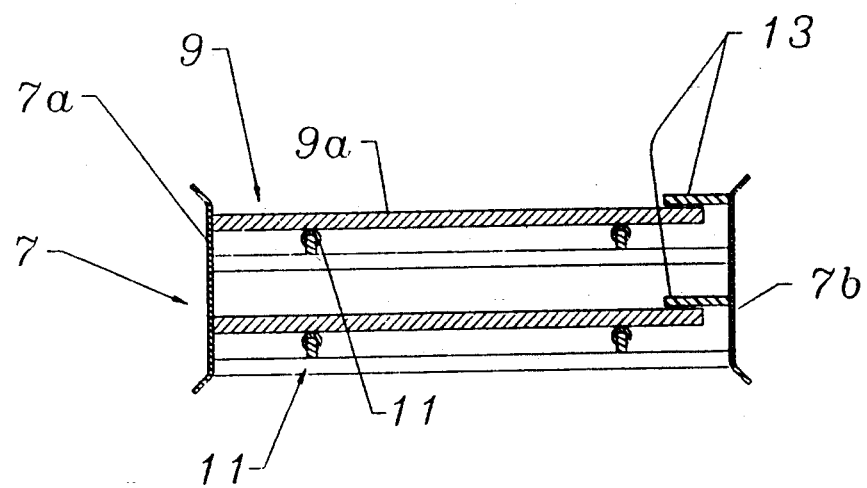
FIG. 2 is a simplified cross-sectional view taken along line 2—2 of FIG. 1.

Turning now to the drawings, there is illustrated, in FIG. 1, a typical 90 left-hand variable radius turn conveyor, including a straight infeed section 1, a turn section 3, and a straight discharge section 5. As best seen in FIG. 2, the conveyor comprises a frame 7 and a flexible, endless belt 9 movably carried thereon, supported on belt supports 11. Belt 9 includes an upper load-carrying portion 9a and a lower, return portion 9b. Frame 7 includes an inner side 7a and an outer side 7b, on which are fixed projecting "hold down" devices 13.

It will be appreciated that movement of belt 9, as indicated by the arrow in FIG. 1, results in friction at the points of contact with inner frame side 7a and "hold down" devices 13. The present invention, as will be hereinafter described, reduces the friction at one or both of these points, by providing belt edge members having a low coefficient of friction, thus reducing the belt tension and required drive force. This change in drive characteristics allows substantial increases in belt loading and/or increases in conveyor length and operating speed without reaching destructive levels of belt tension. As will be illustrated, the invention is applicable to a wide variety of existing conveyor systems, of both the fixed and variable radius types.

Figure 3:
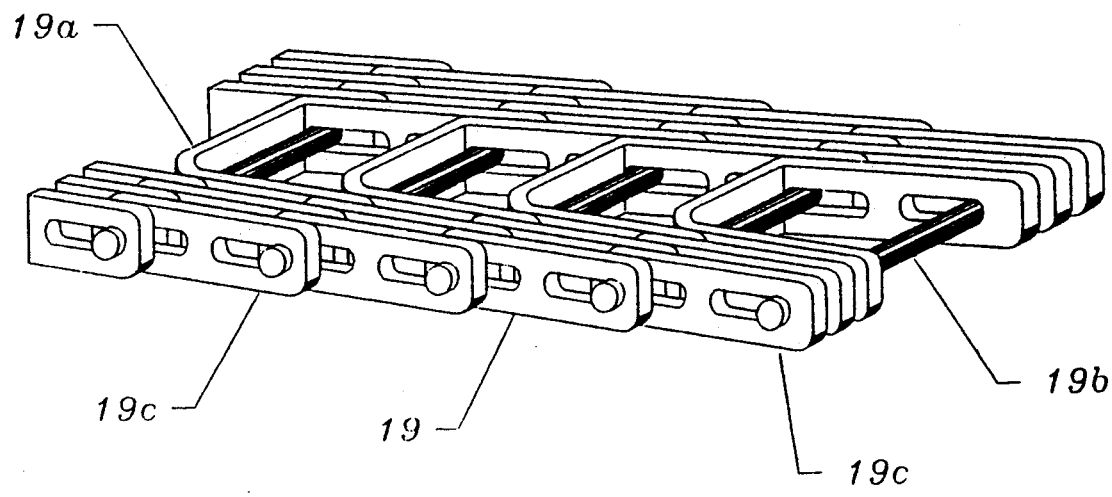
FIG. 3 is a fragmentary perspective view of a conventional variable radius metal link belt.

There is shown, in FIG. 3, a section of a variable radius belt 19 of the type sold by Ashworth Bros., under the trademarks "Omniflex" and "Small Radius Omniflex", by Cambridge Wire Cloth Co., under the trademark "Camflex", and by Maryland Wire Belt Co. This belt may be used in a conveyor system of the type illustrated in FIGS. 1 and 2 and will be described in conjunction therewith. Belt 19 comprises a plurality of flat metal links 19a, typically of stainless or carbon steel, hingedly interconnected by rods 19b, usually of stainless steel, having enlarged or peened heads 19c. Flat side links 19d are provided for reinforcement and to increase the working load of the belt.

Figure 4:
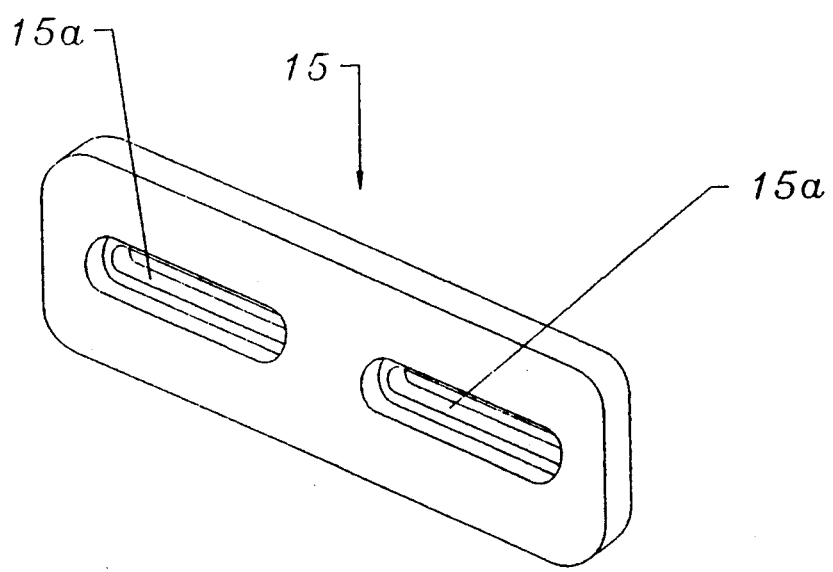
FIG. 4 is a perspective view of a friction-reducing side member for the belt of FIG. 3.

In FIG. 4, there is shown a friction-reducing side member 15 specifically adapted for use in belts of the type shown in FIG. 3. Side members 15 are disposed in place of the outermost ones of the existing side links 9d, in sliding contact with inner frame side 7a. Side member 15 includes two counterbored slots 15a, 15a to receive two adjacent ones of rods 9b, 9b such that rod heads 9c, 9c do not project beyond the surface of side member 15 when installed. Side member 15 is formed of an ultralow friction plastic having a coefficient of friction of less than 0.2. Of particular suitability are ultra-high molecular weight (U.H.M.W.) polyethylene embodying a lubricant, such as silicone, or a nylon incorporating a lubricant, such as molybdenum disulfide. These materials are effective to provide a dry operating environment coefficient of friction as low as 0.1.

Figure 5:
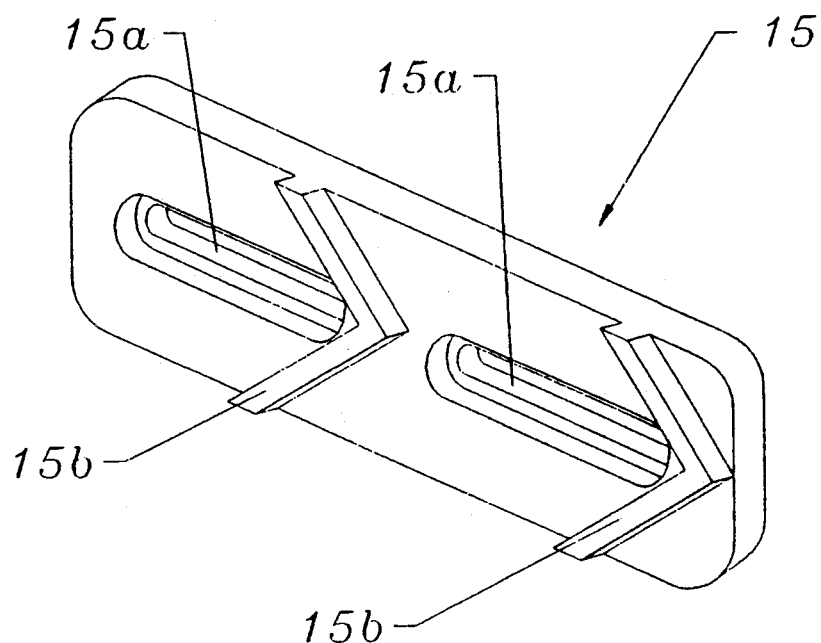
FIG. 5 is a perspective view of a friction-reducing side member, similar to the side member of FIG. 4.

In FIG. 5, there is shown a friction-reducing side member 15, otherwise identical to that of FIG. 4, incorporating a pair of vee-shaped raised members or "plows" 15b, pointing in the direction of belt travel. These plows serve to remove debris and dirt which may enter between side members 15 and frame 7, thereby keeping the contact area clean. Side members with plows may be used solely, or in combination with side members lacking plows, depending upon conveyor operating conditions.

Figure 6:
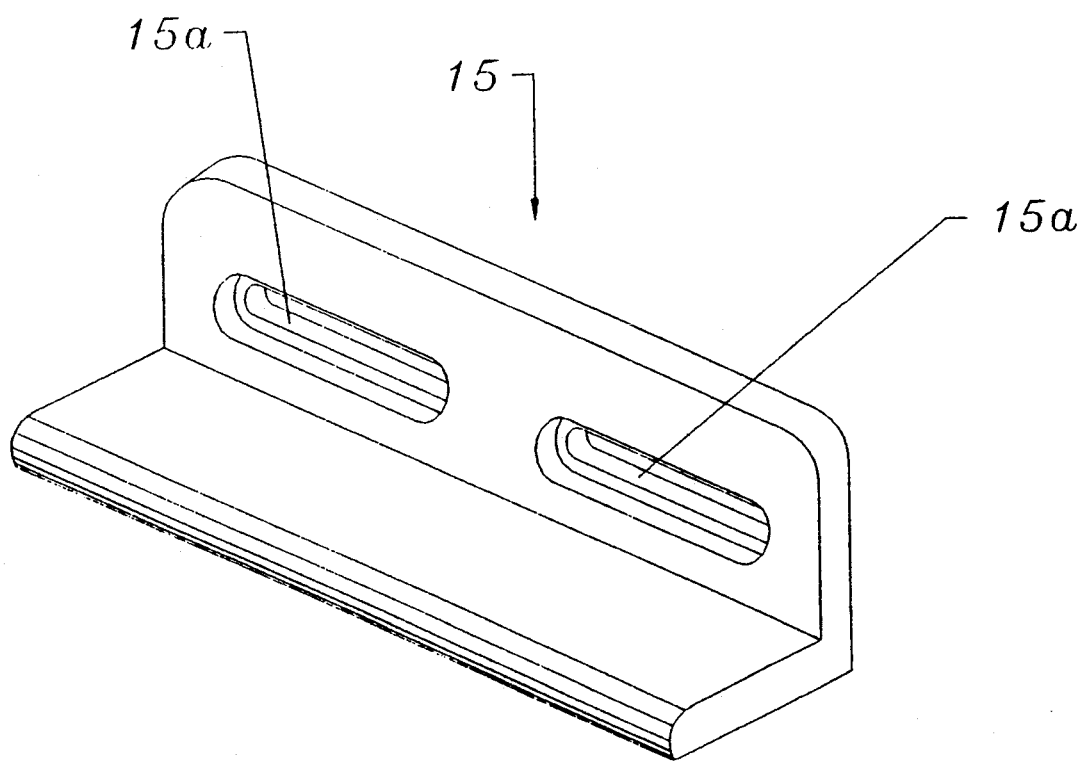
FIG. 6 is a perspective view of frame-engaging side member for the belt of FIG. 3.

In FIG. 6, there is shown a frame-engaging member 17 specifically adapted for use in belts of the type shown in FIG. 3. Frame-engaging members 17 replace the outermost ones of the existing side links 19d on the outer side of belt 19, and are in sliding contact with hold down devices 13 when the belt is in use. Frame-engaging members 17 differ from side members 16 in the provision of a projecting flange or "wing" 15c which cooperates with hold down devices 13 to retain the belt from "lifting" under load, as previously explained.

Figure 7:
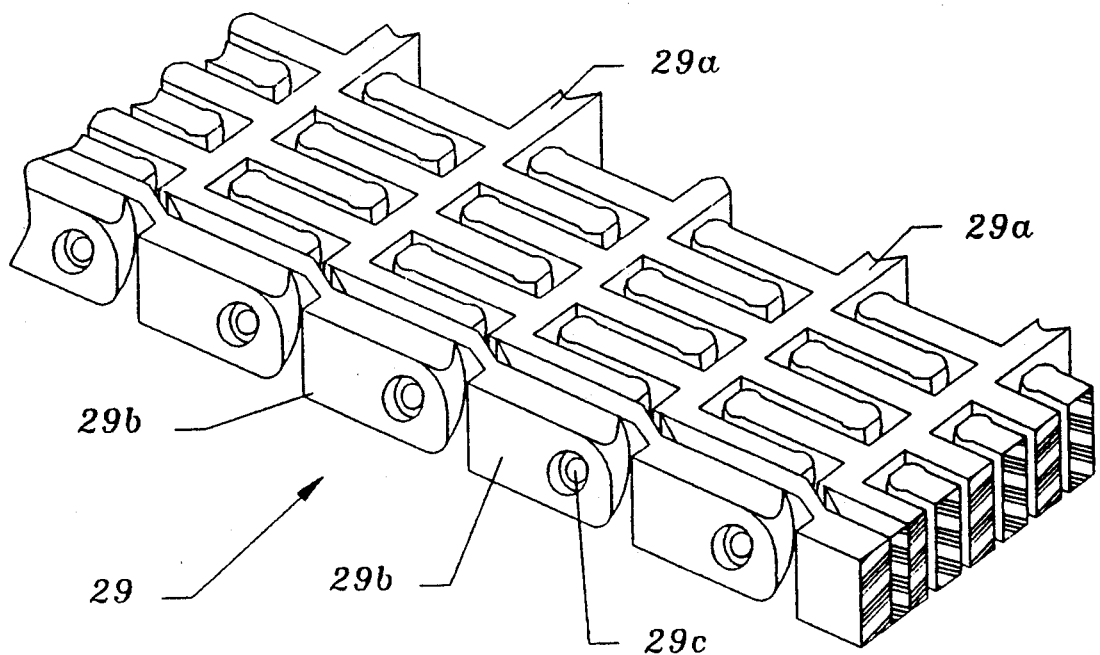
FIG. 7 is a fragmentary perspective view of a conventional variable radius plastic link belt.

There is shown, in FIG. 7, a section of a variable radius belt 29 of the type sold by KVP systems. Belt 29 comprises a plurality of injection molded plastic segments 29a and flat, stepped side links 29b hingedly interconnected by plastic/metal rods (not visible) having enlarged or peened heads 29c.

Figure 8:
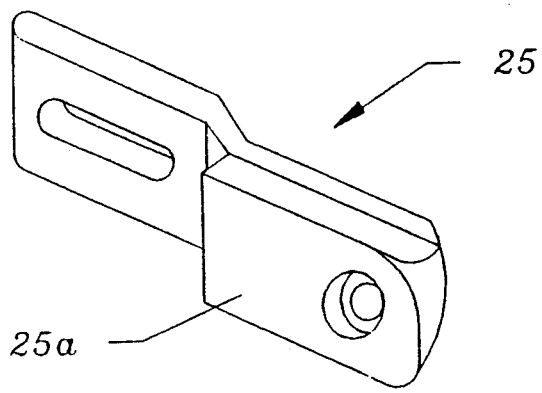
FIG. 8 is a perspective view of a friction-reducing side member for the belt of FIG. 7.

In FIG. 8, there is shown a friction-reducing side member 25 specifically adapted for use in belts of the type shown in FIG. 7, where it replaces the existing side links 29b on the inner side of the belt. It is to be noted that friction-reducing side member 25 differs from the conventional side link 29b by the addition of a layer or pad 25a of ultra low friction plastic, which is in sliding contact with inner frame side 7a.

Figure 9:
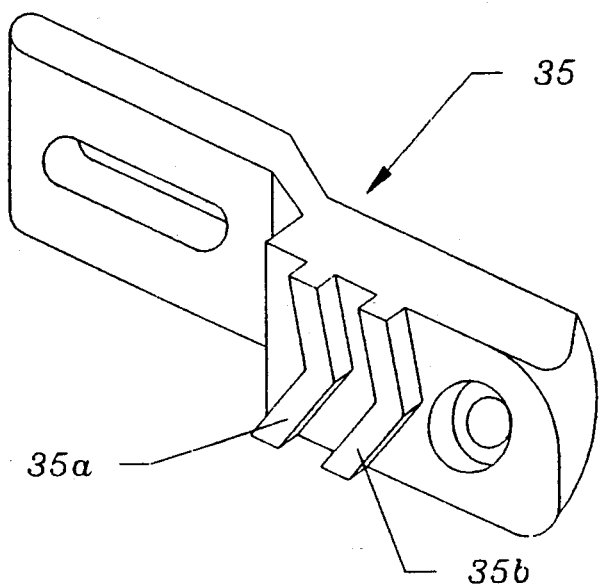
FIG. 9 is a perspective view of a side member, similar to the side member of FIG. 8.

In FIG. 9, there is shown a second friction-reducing side member 35 for use in belts of the type shown in FIG. 7. Side member 35 is formed entirely of ultra low friction plastic and includes a pair of raised plows 35a, 35a.

Figure 10:
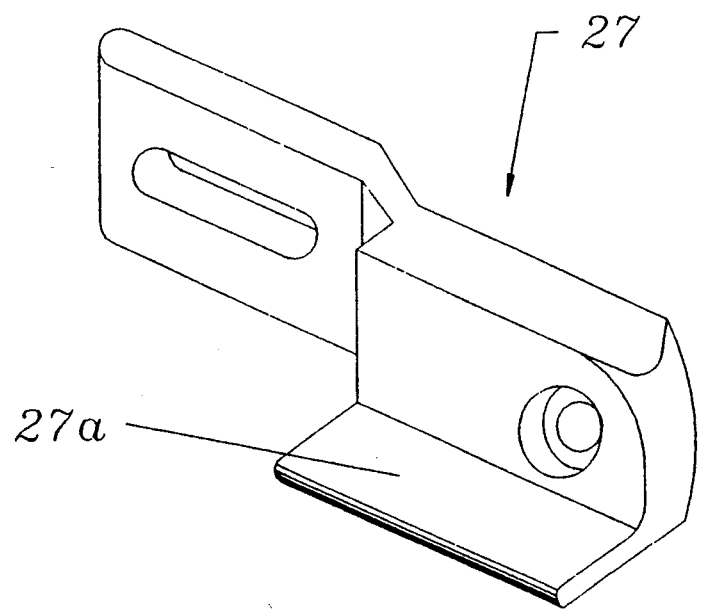
FIG. 10 is a perspective view of a frame-engaging side member for the belt of FIG. 7.
Figure 11:
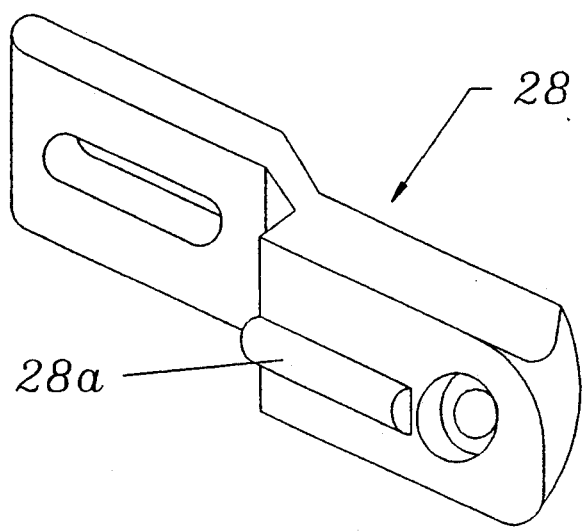
FIG. 11 is a perspective view of a frame-engaging side member for the belt of FIG. 7.

In FIG. 10, there is shown a frame-engaging member 27 specifically adapted for use in belts of the type shown in FIG. 7, where it replaces the existing side links 29b on the outer side of the belt. Frame-engaging member 27 is formed of ultra low friction plastic and includes a projecting wing 27a adapted to slidingly engage hold down devices 13 when the belt is in use. A similar frame-engaging member 28 is shown in FIG. 11. In this embodiment a semi-cylindrical protrusion 28a substitutes for the wing 27a of frame-engaging member 27. In this regard, it should be clearly understood that the frame-engaging member must be configured to co-operate with the particular hold-down devices in use on a conveyor.

Figure 12:
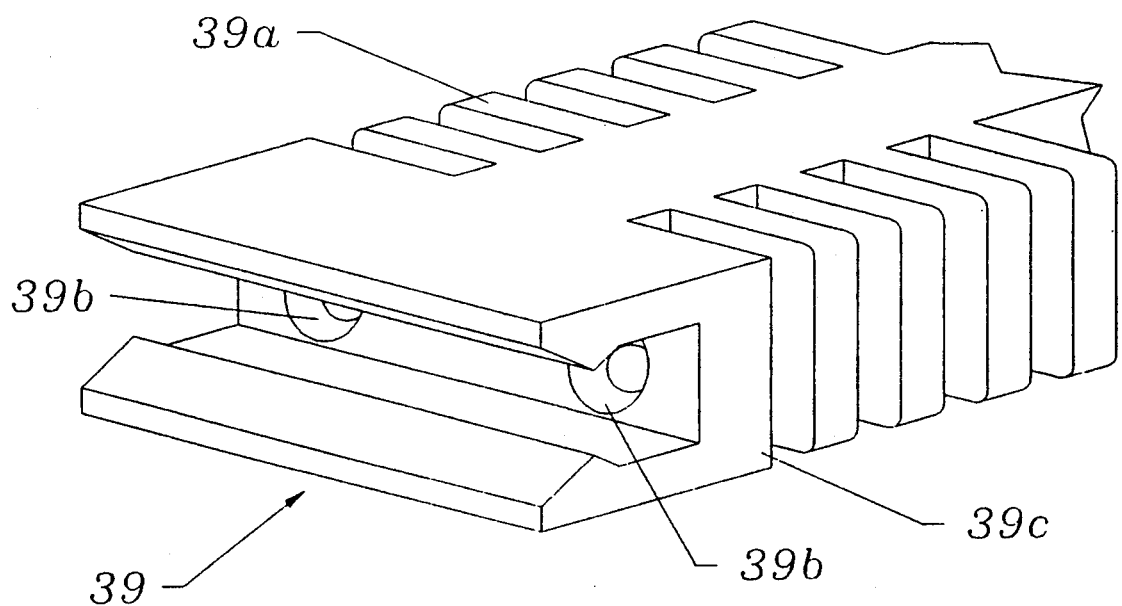
FIG. 12 is a fragmentary perspective view of another conventional variable radius plastic link belt.

Turning now to FIG. 12, there is shown a section of a variable radius belt 39 of the type sold by Intralox, Inc., comprising a plurality of segments, each spanning the entire width of the belt, hingedly interconnected by rods 39b. Segments 39a, which include an edge module 39c at both longitudinal belt edges, are alternated with similar segments (not shown) which differ in that they lack edge modules.

Figure 13:
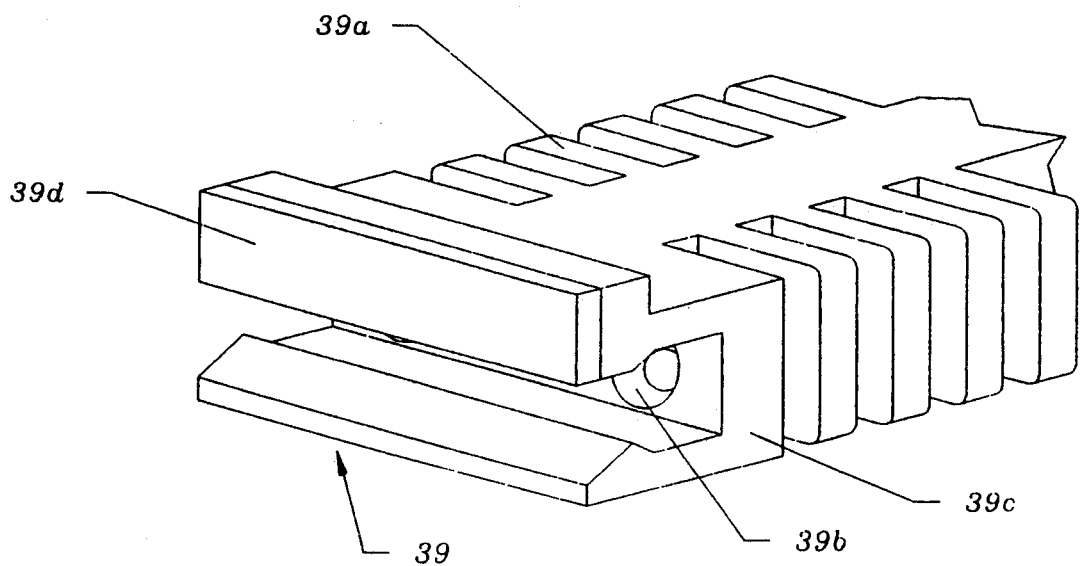
FIG. 13 is a perspective view of a friction-reducing side member for the belt of FIG. 12.
Figure 14:
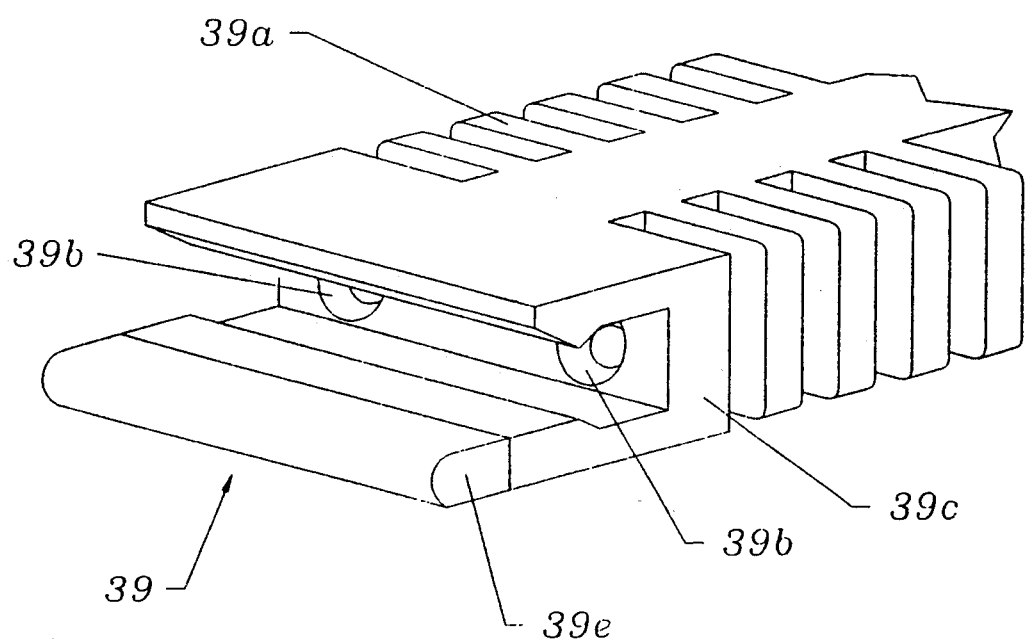
FIG. 14 is a perspective view of a frame-engaging side member for the belt of FIG. 12.

In keeping with the present invention, the edge modules on the inner edge of the belt are provided with a layer or pad 39d of ultra low friction plastic to slidingly engage the inner frame side 7a, as seen in FIG. 13. The opposite edge module on this belt segment, shown in FIG. 14, includes a projecting wing 39c, also formed of ultra low friction plastic.

Figure 15:
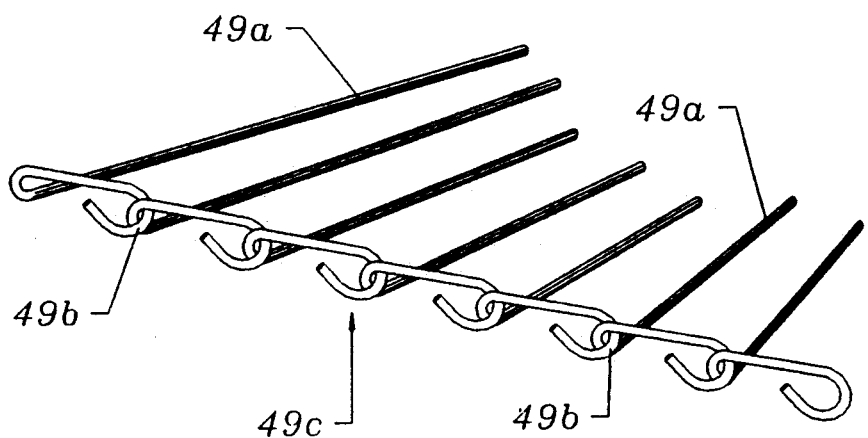
FIG. 15 is a fragmentary perspective view of a conventional fixed radius belt.
Figure 16:
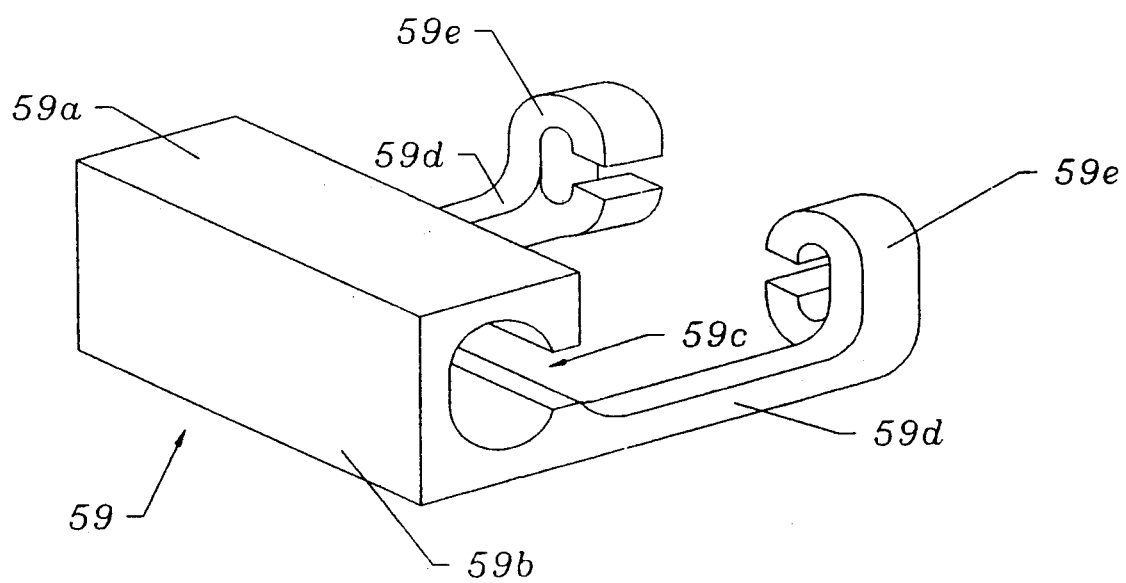
FIG. 16 is a perspective view of a friction-reducing side member for the belt of FIG. 15.

Turning now to FIG. 15, there is shown a section of a fixed radius belt 49, of the type generically known as Sanigrid belting. Belt 49 comprises a plurality of metal rods 49a interconnected by knuckles 49b formed at the rod ends. The outer edge of the belt (not shown) is of greater length than the inner edge 49c, thus describing the belt radius.

Figure 17:
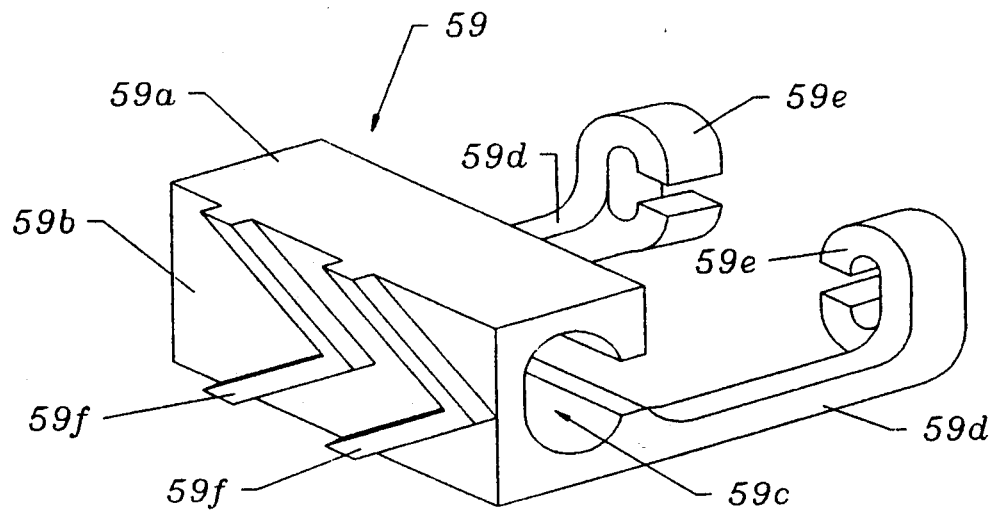
FIG. 17 is a perspective view of a friction-reducing side member similar to the side member of FIG. 16.

In keeping with the present invention, there is provided, for belt 49, a friction-reducing side member 59, formed of ultra low friction plastic, comprising a generally rectangular prismatic body 59a having a substantially planar front face 59b, for sliding engagement with inner frame side 7a, and an open transverse channel 59c, adapted to receive knuckles 49a. A pair of arms 59d, 59d extend rearwardly of body 59c and terminate in inwardly turned engagement members 59e, 59e adapted to engage two adjacent ones of rods 49a, whereby side member 59 may be conveniently placed and retained in position on the inner edge of the belt. In FIG. 17, there is shown an alternate embodiment of side member 59 having a pair of integral raised plows 59f, 59f which contact inner frame side 7a and provide a debris-removing function as previously described.

Figure 18:
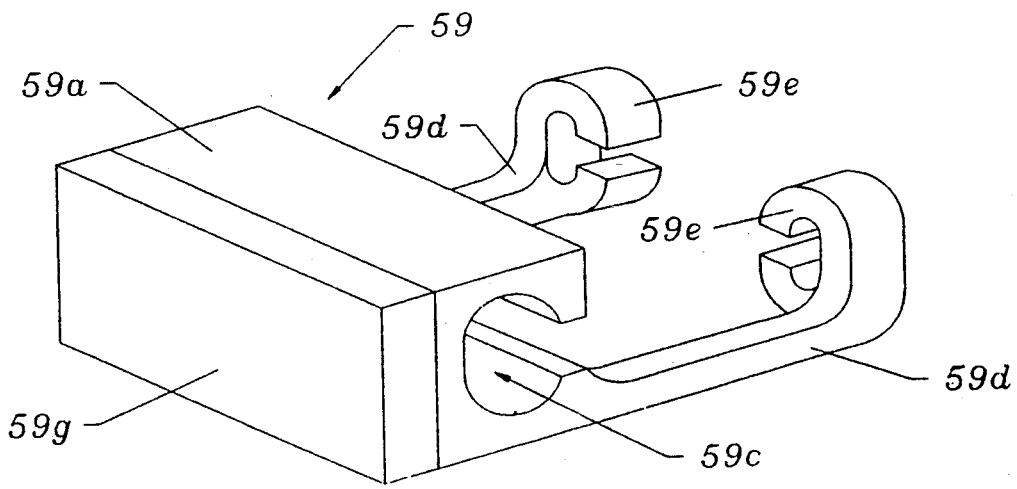
FIG. 18 is a perspective view of a friction-reducing side member for the belt of FIG. 15.

A further alternate embodiment of side member 59 is shown in FIG. 18. In this embodiment, the member is substantially formed of conventional plastic materials and includes a frame-engaging pad 59g of ultra low friction plastic as previously described.

Figure 19:
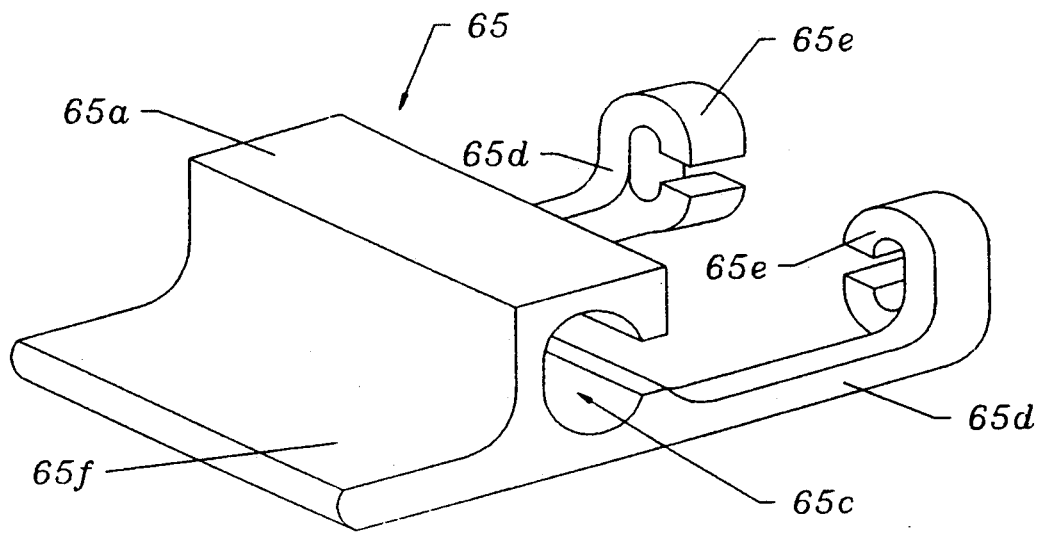
FIG. 19 is a perspective view of a frame-engaging side member for the belt of FIG. 15.
Figure 20:
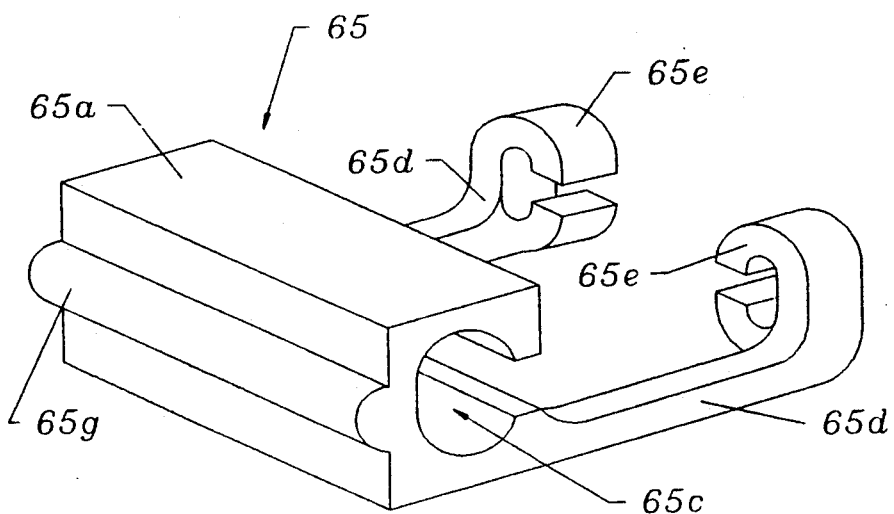
FIG. 20 is a perspective view of a frame-engaging side member for the belt of FIG. 15.

In FIGS. 19 and 20, there are shown two embodiments of a frame-engaging member 65 adapted for use with belt 49. Both embodiments are similar to side members 59 in that they are formed of ultra low friction plastic and comprise a generally rectangular prismatic body 65a having an open transverse channel 65c adapted to receive knuckles 49a. Also similarly to the frame-engaging members, a pair of arms 65d, 65d extend rearwardly of body 65c and terminate in inwardly turned engagement members 65e, 65e adapted to engage two adjacent ones of rods 49a.

In the embodiment of FIG. 19, an integral wing 65f projects from 65a for sliding co-operation with hold down members 13; while in the embodiment of FIG. 20, a semi-cylindrical protrusion 65g is utilized.

It will be appreciated that, in all of the embodiments heretobefore described, the side members and frame-engaging members have spanned the distance between two adjacent ones of the rods which either interconnect belt segments or, in the case of belt 49, comprise the belt. Such elongate side members and frame-engaging members offer the advantage of increased bearing surface and, hence, reduced bearing pressure and a greatly reduced probability of galling or other deformation. It should be recognized, however, that while such an arrangement is preferred, it is not conveniently adaptable to all types of conveyor belts currently in use and that the present invention is not limited thereto.

Figure 21:
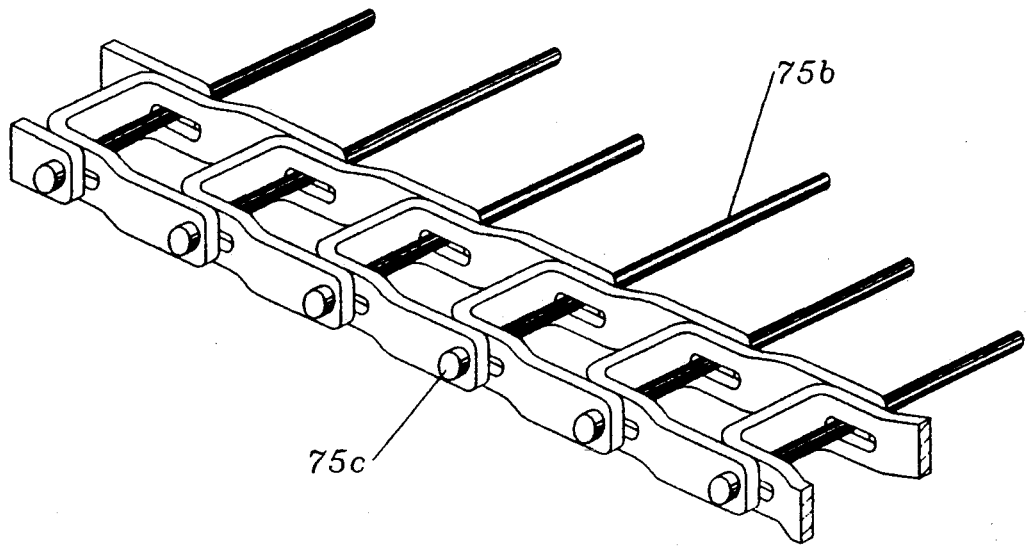
FIG. 21 is a fragmentary perspective view of another conventional variable radius metal link belt.

Turning now to FIG. 21, there is shown a section of a variable radius belt 75 of the type sold by Ashworth Bros. under the trademark Omni Grid, and by Cambridge Wire Cloth Co. under the trademark Camgrid. Belt 75 comprises a plurality of chainlike metal links 75a disposed at the belt edges and hingedly interconnected by metal rods 75b which form the load-carrying surface. The rod heads 75c are peened and bear against the inner frame side 7a.

Figure 22:
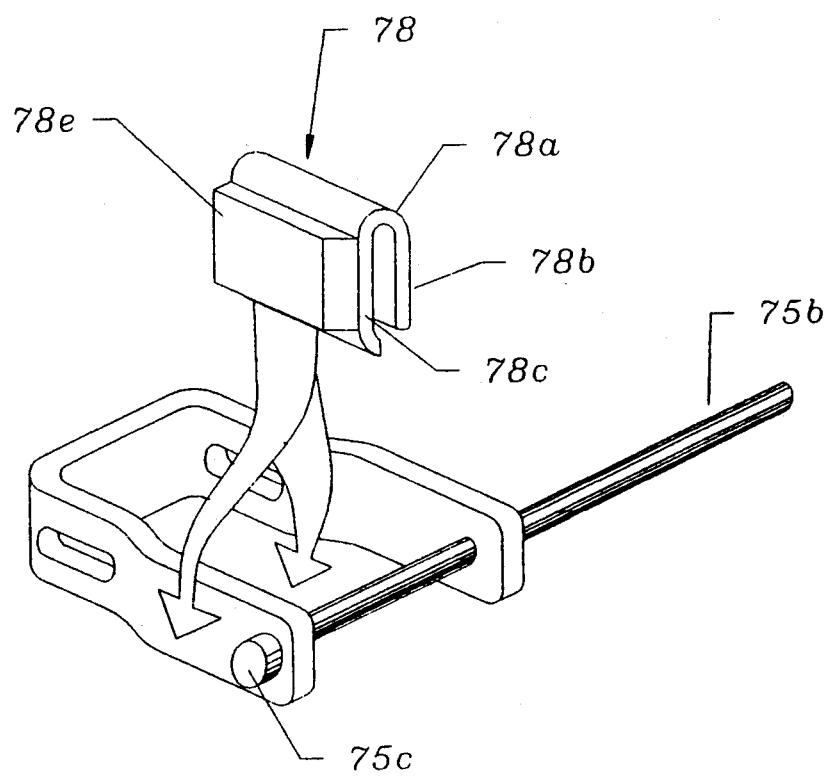
FIG. 22 is a perspective view of a friction-reducing side member for the belt of FIG. 21.

There is shown in FIG. 22 a friction-reducing side member 78 for use with belts of the type of FIG. 21, comprising a clip-like member 78a adapted to snap over a link 75a as indicated by the arrows.

Figure 23:
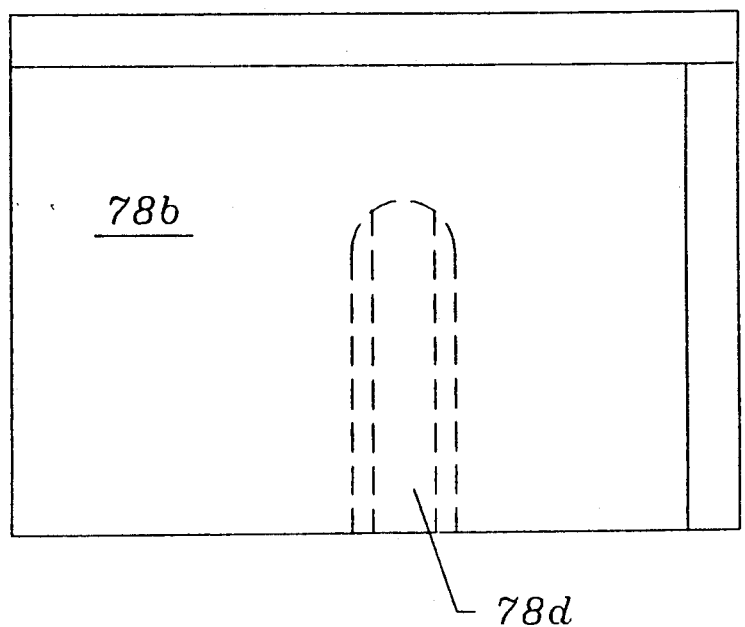
FIG. 23 is a front plan view of the side member of FIG. 22.

As seen in FIG. 23, the inner flap 78b of clip 78a includes a slit 78d allowing side member 78 to seat over rod 75b. Disposed on the outer flap 78c of clip 78a is a pad 78e of ultra low friction plastic for sliding co-operation with inner frame side 7a.

Figure 24:
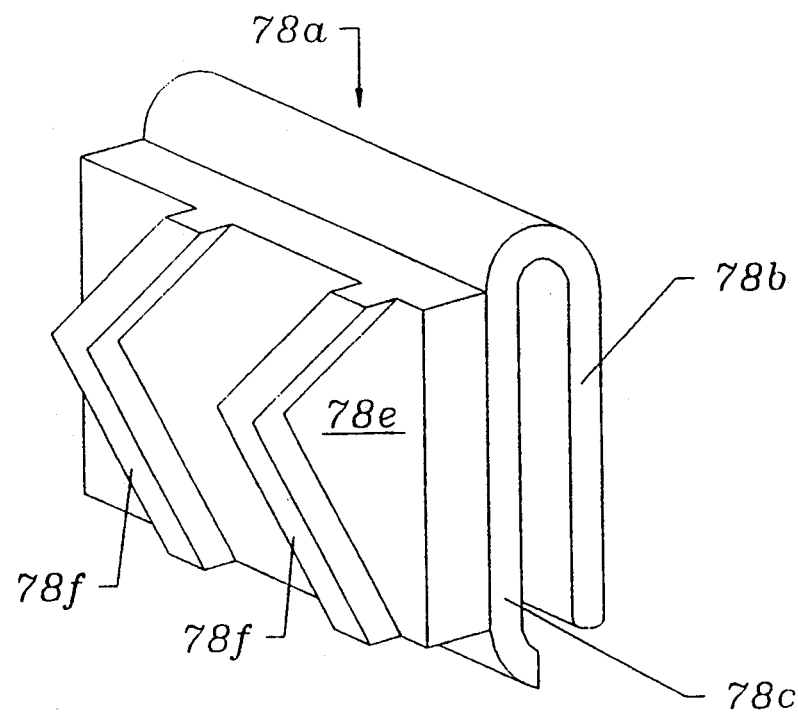
FIG. 24 is a perspective view of a friction-reducing side member, similar to the side member of FIGS. 22 and 23.

In an alternate embodiment shown in FIG. 24, a pair of integral raised plows 78f, 78f have been formed on pad 78e for the reasons previously described.

Figure 25:
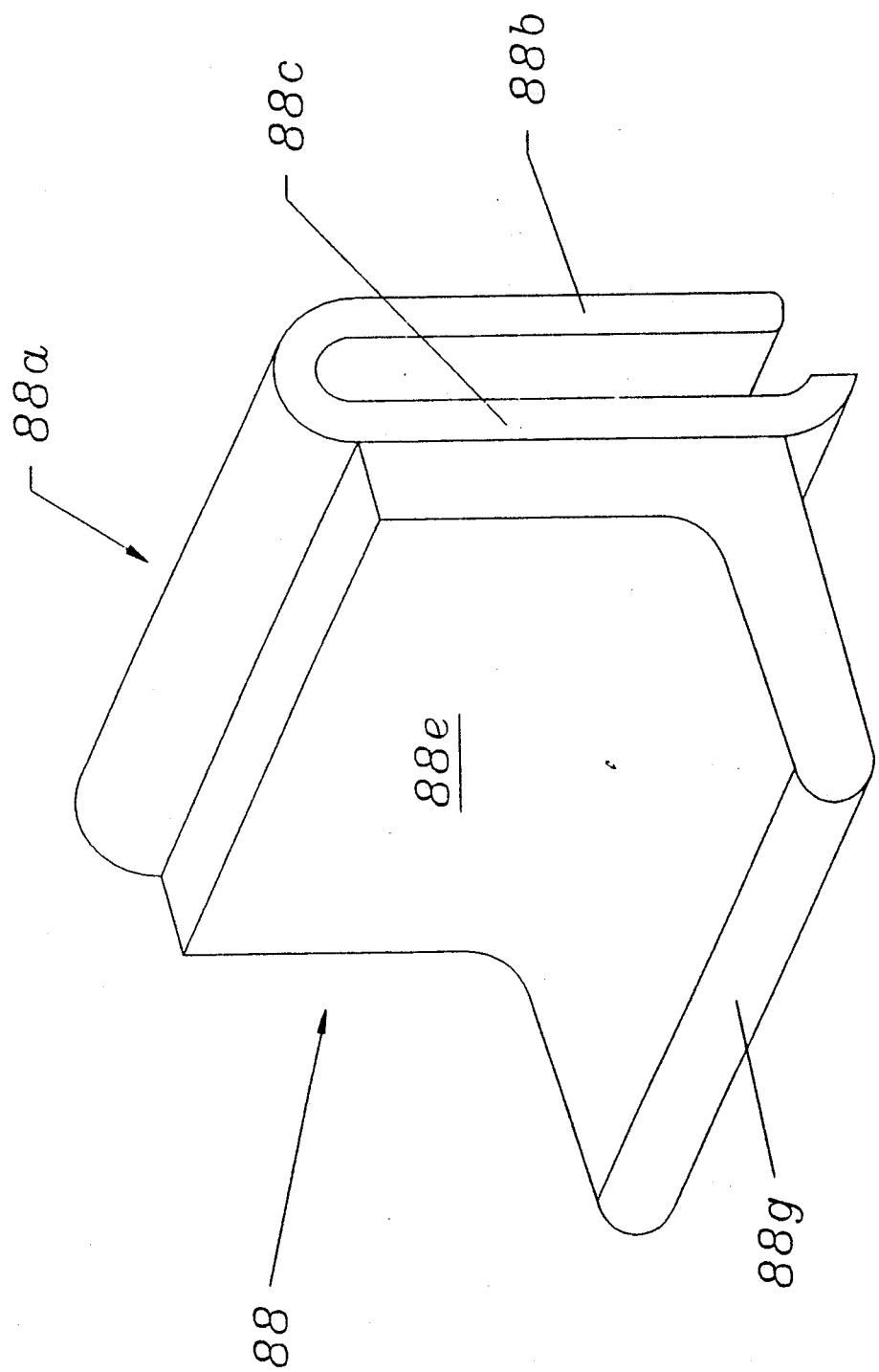
FIG. 25 is a perspective view of a frame-engaging side member for the belt of FIG. 21.

In FIG. 25, there is shown a frame-engaging member 88 adapted for use with belt 75. Similar to side member 78, frame-engaging member 88 comprises a clip-like member 88a having an inner flap 88b and an outer flap 88c. A pad 88e of ultra friction plastic is disposed on outer flap 88c and includes an integral projecting wing 88g adapted for sliding engagement with hold down devices 13, for the reasons previously described.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An improved turn conveyor comprising a frame and a flexible endless belt movably carried on said frame, said frame and said belt defining a load-conveying path including at least one curve, said belt including a plurality of friction-reducing members disposed along the inner edge thereof to minimize friction between said inner edge of said belt and said frame, said friction-reducing members including means for removing debris from between said members and said frame.

2. The improved turn conveyor of claim 1, wherein said friction-reducing members are at least partly formed of a material having a coefficient of friction of less than 0.2.

3. The improved turn conveyor of claim 1, further comprising a plurality of frame-engaging members disposed along the outer edge of said belt and adapted to engage said frame to retain said belt outer edge in a desired relation thereto, said frame-engaging members being at least partly formed of a material having a coefficient of friction of less than 0.2.

4. The improved turn conveyor of claim 1, wherein said belt comprises a plurality of belt segments hingedly interconnected by rods disposed transverse said load-conveying path, and said friction-reducing members each engage two adjacent ones of said rods.

5. The improved turn conveyor of claim 2, wherein said material is ultra high molecular weight (U.H.M.W.) polyethylene mixed with a lubricant.

6. The improved conveyor of claim 2, wherein said material is nylon mixed with a lubricant.

7. An improved turn conveyor comprising a frame and a flexible endless belt movably carried on said frame, said frame and said belt defining a load-conveying path including at least one curve, said belt including a plurality of friction-reducing members disposed along the inner edge thereof to minimize the friction between said belt and said frame, at least a portion of each of said friction-reducing members being formed of a material having a coefficient of friction of less than 0.2, and said portion of each of said friction-reducing members being in sliding contact with said frame, said friction-reducing members further comprising means for removing debris from between said belt and said frame.

8. The improved turn conveyor of claim 7, further comprising a plurality of frame-engaging members disposed along the outer edge of said belt, at least a portion of each of said frame-engaging members being formed of a material having a coefficient of friction of less than 0.2, and said portion of each of said frame-engaging members slidingly engaging said frame.

9. The improved turn conveyor of claim 7, wherein said belt comprises a plurality of segments hingedly interconnected by rods disposed transverse said load-carrying path, and said friction-reducing members each engage two adjacent ones of said rods.

* * * * *